United States Patent [19]

Suzuki et al.

[11] Patent Number: 4,897,683
[45] Date of Patent: Jan. 30, 1990

[54] FOCUSING LENS DRIVE METHOD

[75] Inventors: Noboru Suzuki; Shigeo Toji, both of Tokyo, Japan

[73] Assignee: Asahi Kogaku Kogyo Kabushiki Kaisha, Tokyo, Japan

[21] Appl. No.: 174,466

[22] Filed: Mar. 28, 1988

[30] Foreign Application Priority Data

Mar. 26, 1987 [JP] Japan .................................. 62-72669

[51] Int. Cl.⁴ ............................................. G03B 3/10
[52] U.S. Cl. .................................................. 354/400
[58] Field of Search ...................... 354/400, 402, 195.1

[56] References Cited

U.S. PATENT DOCUMENTS 4,303,321 12/1981 Enomoto et al. .
4,613,224 9/1986 Ogasawara .......................... 354/402
4,745,425 5/1988 Kusaka ................................ 354/400
4,772,909 9/1988 Ogasawara .......................... 354/400

Primary Examiner—W. B. Perkey
Attorney, Agent, or Firm—Sughrue, Mion, Zinn, Macpeak & Seas

[57] ABSTRACT

A method for use in an automatic focusing camera for driving a focusing lens to a focused position in which the speed is changed in decreasing incremental steps as the lens approaches the focused position and the speed is made independent of changes in ambient temperature or the orientation of the camera relative to the direction of gravitational force. The speed of the lens is controlled in accordance with duty ratio data prestored in a memory and which is applied to control the duty ratio of a drive signal to a motor employed to position the focusing lens. A correction value for correcting for the effects of changes in ambient temperature is obtained prior to the start of the focusing operation and applied to correct the duty ratio of the drive signal during the actual focusing operation.

16 Claims, 5 Drawing Sheets

FOCUSING LENS DRIVE METHOD

BACKGROUND OF THE INVENTION

The present invention relates to a device having an AF (automatic focusing) capability (function) such as an AF camera. More particularly, the invention relates to a drive method for such a camera adapted to move a movable focusing lens to the focused position.

Recently, various interchangeable lens cameras having an AF capability have been proposed and marketed.

FIG. 1 is a block diagram showing the general arrangement of such a camera. FIG. 1 primarily shows components related to an AF mechanism; that is, some components generally provided for the camera and lens systems are not shown in FIG. 1 for clarity of illustration.

In FIG. 1, reference numeral 11 designates a camera body, and 31, a photographing lens which is detachably mounted on the camera body 11. The camera body and the photographing lens are mechanically connected to each other through a clutch 13 on the body side and a clutch 33 on the lens side, and electrically connected to each other through an electrical contact group 15 on the body side and an electrical contact group 35 on the lens side.

The photographing lens 31 includes a lens system 39 including a lens 37 movable along the optical axis to focus on a designated object, a drive force transmitting mechanism 41 for transmitting the drive force of a drive source (described below) in the camera body to move the movable lens 37 to the focused position, and a lens ROM 43 for storing aperture data for the photographing lens and position data for the movable lens 37.

The components of the camera body 11 include an image pickup section 17 employing, for instance, a CCD (charge-coupled device) sensor receiving a part of the light from the object which has passed through the photographing lens 31. The camera body 11 further includes a control section 19 having a variety of functions such as calculating the amount of defocusing indicating the amount of deviation from the focused position according to an output signal from the image pickup section 17 and determining the correction direction for focusing the lens on the object. The camera body further includes a drive mechanism 25 composed, for instance, of an electric motor 21 for driving the movable lens 37 in the photographing lens 31 and an encoder 23 for detecting the number of revolution of the motor 21. The drive force of the drive mechanism 25 is transmitted through the clutch mechanisms 13 and 33 and the drive force transmitting mechanism 41 to the movable lens 37 to move the latter.

The amount of drive for moving the movable lens 37 to the focused position can be determined from the number of pulses P counted by the encoder 23 detecting the number of revolutions of the motor 21 (hereinafter referred to as a pulse count value P when applicable). In a conventional AF camera, the amount D of defocusing is obtained by the control section 19, and the pulse count value P corresponding to the amount D of defocusing is obtained according to the following equation:

$$P = K \cdot D \qquad (1)$$

where K is the lens movement conversion coefficient. The coefficient K is determined in advance in such a manner that a pulse count value P which permits the movable lens 37 to be moved, according to the amount of D of defocusing, to the position where the lens is positively focused on the object is obtained.

Each photographing lens has its own coefficient K. The coefficient K is stored in the lens ROM 43 of the photographing lens in advance. In the case where the photographing lens is a zoom lens, a plurality of coefficients are stored in the lens ROM.

The movable lens 37 can be moved to the focused position by continuously applying a constant current to the motor 21, termed a DC control mode or by intermittently applying a current to the motor, termed a PWM (Pulse Width Modulation) control mode. In each of these modes, the movable lens is moved until the number of pulses counted by the encoder 23 reaches the pulse count value P obtained from equation (1).

Driving the movable lens in the DC control mode or in the PWM control mode under predetermined driving conditions though suffers from the following difficulties:

When the ambient temperature changes, the viscosity of grease in the drive mechanism or in the drive force transmitting mechanism for driving the movable lens changes. This changes the load on the lens driving motor. Accordingly, when the lens is driven under the present conditions, the lens moving speed changes with the ambient temperature.

Furthermore, the lens moving speed changes depending on the posture of the camera due to the effects of gravity; that is, the gravitational force acting on the focusing lens in different when the focusing lens is moved in the direction of gravity and in the opposite direction under the same driving conditions. Specifically, when the focusing lens is moved in the direction opposing the force of gravity, the lens driving load on the motor is increased. As a result, the lens moving speed in the direction of gravity is different from that in the opposite direction.

The above-described lens moving speed variations prevent quick and accurate achievement of automatic focusing.

SUMMARY OF THE INVENTION

An object of the invention is to eliminate the above described difficulties accompanying a conventional lens driving method. More specifically, an object of the invention is to provide a drive method for a focusing lens which can smoothly move the focusing lens at a desired speed to the focused position.

The foregoing and other objects of the invention have been achieved by the provision of a method for driving a focusing lens to a focused position, comprising the steps of applying a pulse-width-modulated signal to a drive device for moving the focusing lens to move the focusing lens toward the focused position, with a duty ratio of the pulse-width-modulated signal being determined in accordance with prestored data, detecting the speed of movement of the focusing lens towards the focused position, and correcting the duty ratio of the pulse-width-modulated signal so as to move the focusing lens at a speed indicated by the prestored data. The step of correcting the duty ratio is effected by determining a correction value effective to correct for changes in the speed arising due to changes in ambient temperature or the posture of the focusing lens relative to the direction of the force of gravity, storing the correction value, and applying the correction value to correct the duty ratio. To detect the speed of movement of the focusing lens, a pulse signal having a frequency indicative of the speed of movement is produced with a detector, such as a pulse encoder, detecting the movement of the lens.

In the inventive drive method, the focusing lens is driven with a drive signal of a predetermined duty ratio and the difference between the speed of movement of the focusing lens and a speed of movement corresponding to the predetermined duty ratio stored in the memory is utilized to obtain the correction value for the speed deviation caused by disturbances such as changes in the ambient temperature and the posture of the camera.

In the drive method of the invention, the speed of movement of the focusing lens, the correction value and the data stored in the memory are utilized to determined drive conditions for obtaining a speed lower than the speed of movement of the focusing lens. As a result, the drive conditions for moving the focusing lens smoothly to the focused position can be determined with high accuracy.

DESCRIPTION OF THE PREFERRED EMBODIMENTS

Figure 1:
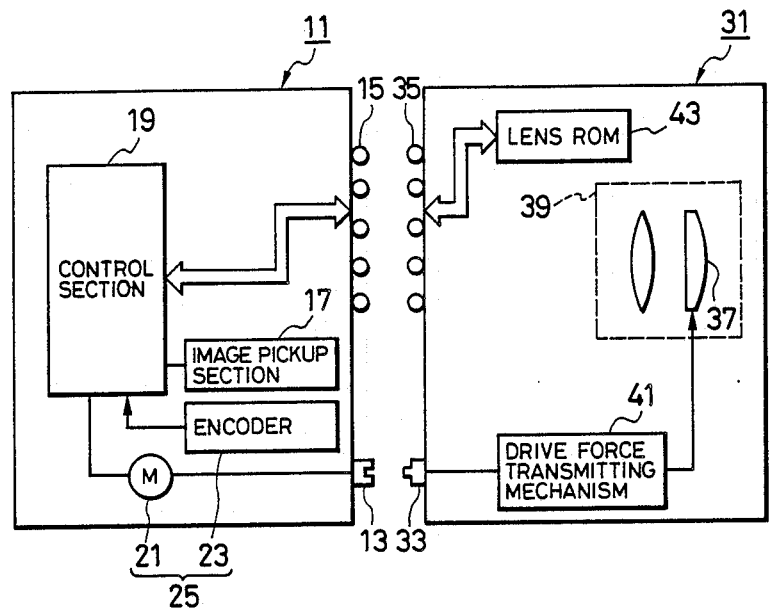
FIG. 1 is a block diagram showing the arrangement of a conventional AF camera.

Preferred embodiments of the invention will now be described with reference to the accompanying drawings. The drawings are simplified so that the technical concept of the invention can be more readily understood. It goes without saying that the dimensions, size and configurations of the various components are not limited to those shown in the drawings. In the drawings, like parts are designated by like reference numerals or characters.

Figure 2:
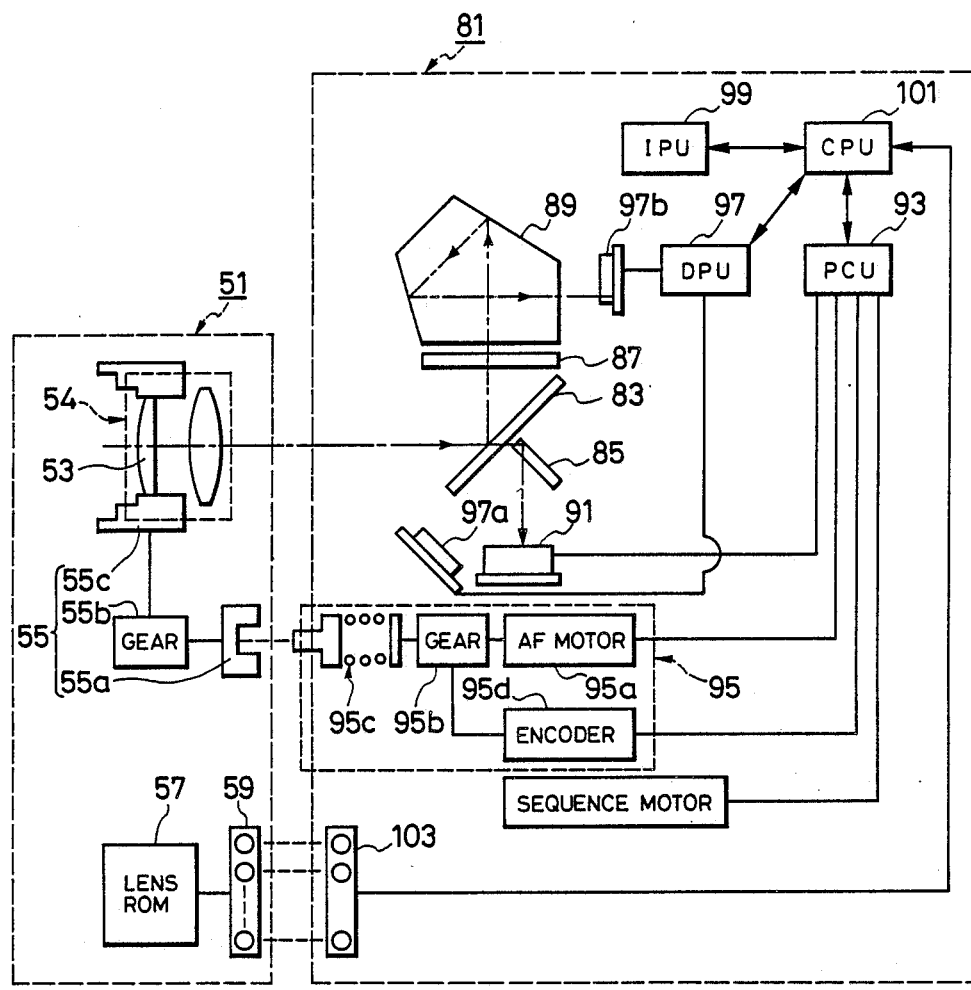
FIG. 2 is a block diagram showing the arrangement of a camera equipped with a focusing lens drive device constructed according to the invention.

The arrangement of a drive device for a focusing lens according to the invention will be described with reference to an AF camera equipped with the drive device. FIG. 2 is a block diagram outlining an example of the arrangement of such an AF camera.

In FIG. 2, reference numeral 51 designates a photographing lens, and 81, a camera body on which the photographing lens 51 is mounted.

The photographing lens 51 is composed of a lens system 54 including a focusing lens 53 movable along the optical axis to focus on an object; a drive force transmitting mechanism 55 including a clutch 55a, a gear 55b and a helicoid screw 55c to transmit the drive force of a drive source (described below) to the movable lens 53 to move it to the focused position; a lens ROM 57 for storing the aperture value data of the photographing lens and the position data of the focusing lens 53; and an electrical contact group 59 on the lens side adapted to electrically connect the photographing lens 51 to the camera body.

The camera body 81 includes an optical system including a main mirror 83, an auxiliary mirror 85, a focusing screen 87 and a pentagonal prism 89; and an image pickup section 91 receiving a part of the light from the object which has passed through the photographing lens. The image pickup section 91 may be designed according to a focusing-position detection system. In this embodiment, the image pickup section 91 includes an optical system including a separator lens suitable for use in a correlation method (phase difference system) and a CCD (charge-coupled device) sensor having two image pickup regions. The camera body 81 further includes an AF control section (PCU) 93 for controlling the image pickup section and a drive mechanism (described below) for driving the focusing lens 53. The drive mechanism 95 used to drive the focusing lens 53 in the photographing lens 51 is composed of an AF motor 95a which is, for instance, a DC motor, a gear 95b, a clutch 9c and an encoder 95d for detecting the number of revolution of the motor 95a. The drive force of the drive mechanism 95 is transmitted through the clutch 95c on the body side and the clutch 55a of the lens side to the focusing lens 53 to move the latter along the optical axis.

The camera body 81 further includes light detecting elements 97a and 97b and a DPU (automatic exposure control) section 97 for AE (automatic exposure) control; an IPU (display control section) 99 for controlling display operations; a CPU (central control unit) 101 for controlling the control sections 93, 97 and 99; and an electrical contact group 103 on the body side which is coupled to the electrical contact group 59 on the lens side.

Figure 3:
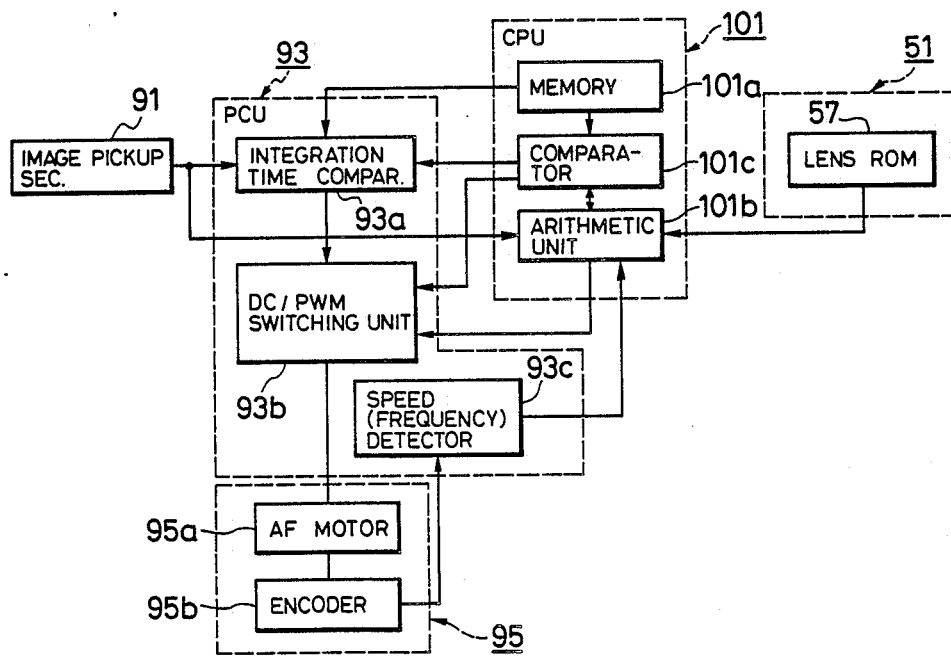
FIG. 3 is a block diagram showing details of a control section and a control processing unit used in the drive device of FIG. 2.

FIG. 3 is a block diagram for a description of the functions of the PCU 93 and the CPU 101. Conducive to a full understanding of the functions of the control sections 93 and 101, components described above are also shown in FIG. 3.

The PCU 93 includes an integration time comparator 93a for the CCD sensor of the image pickup section 91; a switching unit 93b for applying a control signal to the drive mechanism 95 of the AF motor 95a in response to the output signal of the CPU 101 to selectively drive the AF motor in the DC control mode or in the PWM control mode; and a focusing-lens speed (frequency) detector 93c. The switching unit 93b is designed so that when the PWM control mode is selected, the switching unit 93b changes the pulse duty ratio thereby to convert the lens speed to a plurality of speeds (described below in more detail).

The CPU 101 includes a memory for storing a CCD reference integration time, a reference pulse count for determining whether the AF motor 95a is driven in the DC control mode or in the PWM control mode, a reference value for determining whether or not an amount of defocusing is effective, and a reference value for determining whether or not the lens is focused on the object; arithmetic means 101b for calculating an amount D of defocusing and a pulse count value P corresponding to the amount of defocusing; and comparator 101c for comparing, for instance, the amount D of defocusing with the corresponding reference value stored in the memory.

In the AF camera thus designed, the various components of the drive device according to the invention can be constructed as follows:

The memory for storing the data indicating the relation between the speed of movement of the focusing lens 53 to the focusing position and the duty ratio of a drive signal supplied to the AF motor 95a to drive the focusing lens 53 can be formed by the lens ROM 57. The data discussed above will be further described with reference to FIG. 4.

Figure 4:
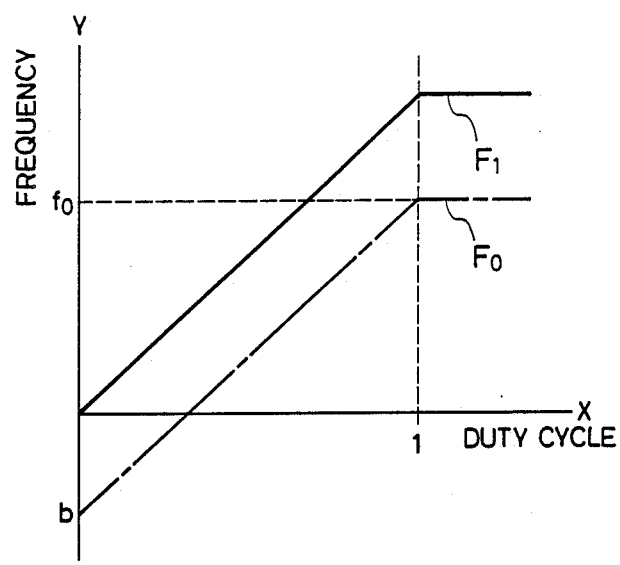
FIG. 4 is a frequency-versus-duty cycle graphical representation used for a description of the operation of the focusing lens according to the invention.

In FIG. 4, the horizontal axis represents the duty ratio. (A duty ratio of 1 indicates DC drive.) The vertical axis represents the speed of movement of the focusing lens 53. In FIG. 4, the speed of movement is indicated by the frequency obtained according to the output pulse count value of the encoder 95d. While, with a photographing lens mounted on the camera body, the duty ratio of the drive signal for the AF motor 95a is gradually decreased beginning with a duty ratio 1, the frequency change is detected. The results of detection of the frequency change are plotted to form a characteristic curve $F_1$ in FIG. 4. The characteristic curve $F_1$ can be approximated with the following equation:

$$y = ax - b \quad (2)$$

where x is the duty ratio and y is the frequency.

In the invention, the coefficient a in equation (2) is stored in the lens ROM 57 in advance. In equation (2), b is the value which changes when the load of the AF motor is changed by disturbances such as changes in the ambient temperature or the posture of the camera. Accordingly, the value b can be used for correcting the deviation in the speed of movement of the focusing lens caused by such disturbances. The characteristic curve including the correcting value is as indicated at $F_0$ in FIG. 4.

A speed (frequency) detector for obtaining, when a photographing lens having the lens ROM in which the coefficient a has been stored is mounted on the camera body and the focusing lens 53 is driven with a predetermined duty ratio at a normal ambient temperature and for horizontal posture of the camera, the speed of movement (frequency in this case) of the focusing lens is mainly determined with the encoder 95d and the speed (frequency) detector 93c of the PCU 93. The frequency can be obtained by counting the output pulses of the encoder for a reference period of time, or by measuring the time interval between adjacent ones of the output pulses of the encoder can be measured.

A correction value used to correct deviation in the speed of movement of the focusing lens attributed to a change of ambient temperature or posture of the camera can be determined using the arithmetic unit of the CPU 101. The correcting value can be obtained as follows:

It is assumed that, when the focusing lens is driven with a duty ratio 1 (x=1) which is determined in advance, the frequency detected during this drive period is $f_0$. If these values are inserted into equation (1), then the correction value b can be obtained. That is, in this case, the correcting value b is:

$$b = a - f_0 \quad (3)$$

The duty ratio of the drive signal used to drive the focusing lens 53 at a speed (frequency) lower than the detected frequency can be determined using the arithmetic unit 101b of the CPU 101 utilizing the correcting value b, the detected frequency $f_0$, and equation (1) above. In the case where the frequency lower than the detected frequency $f_0$ is $f_0/n$, the duty ratio $x_n$ of the drive signal providing the frequency can be obtained from the following expression based on equation (2):

$$x_n = ((f_0/n) + b)/a \quad (4)$$

Accordingly, with the drive device of the invention, deviations in the speed of movement of the focusing lens attributed to changes in ambient temperature or in the posture of the camera can be corrected, and the corresponding duty ratio of the drive signal driving the focusing lens can be obtained with high accuracy.

The above-described characteristic curve $F_1$ is shown merely by way of example, and it may be changed depending on the photographing lens used. However, this embodiment will be described with reference to the approximate expression.

Figure 5A:
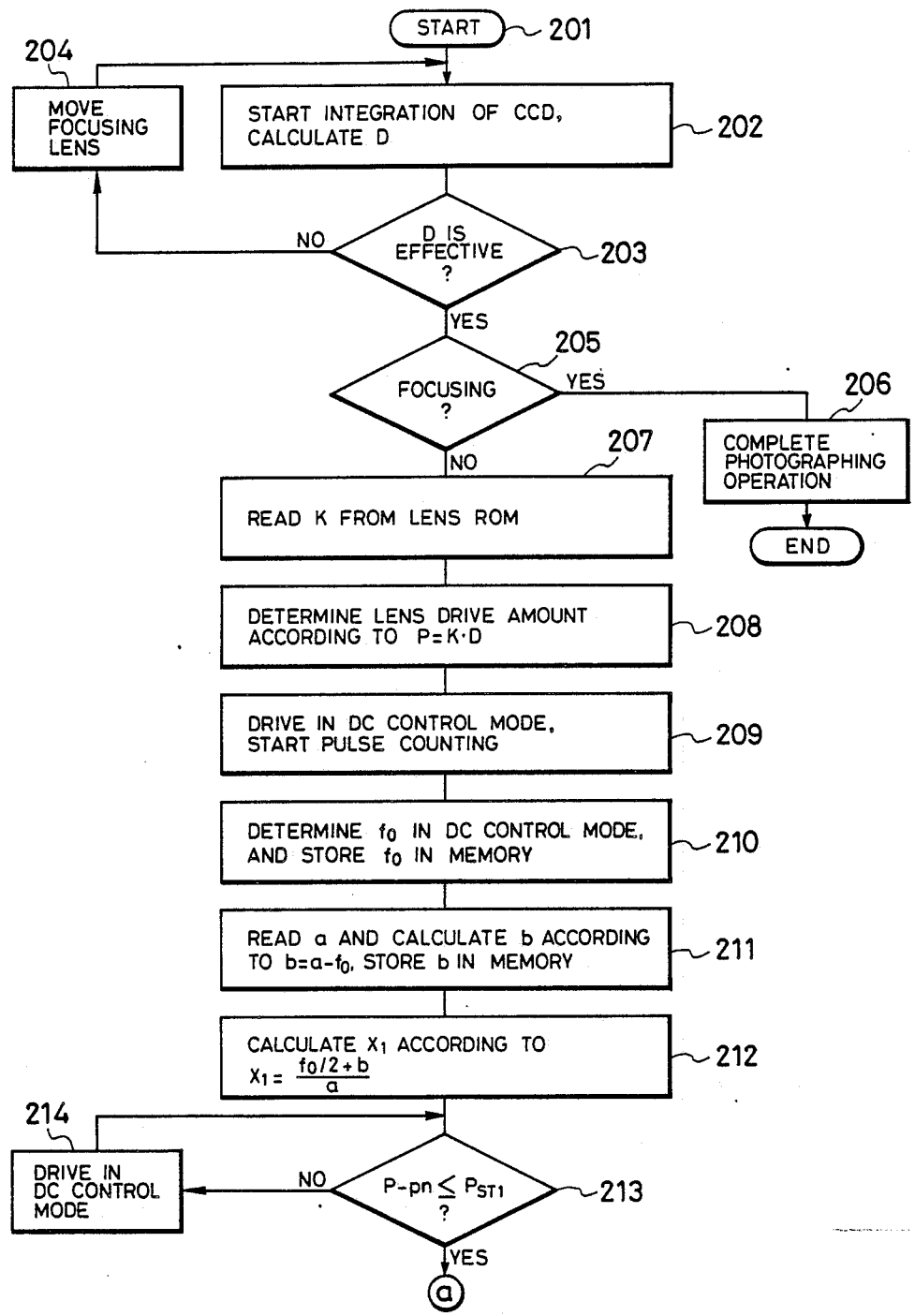
FIGS. 5A and 5B, taken together, are two parts of a flowchart an example of the operation of the drive device according to the invention.
Figure 5B:
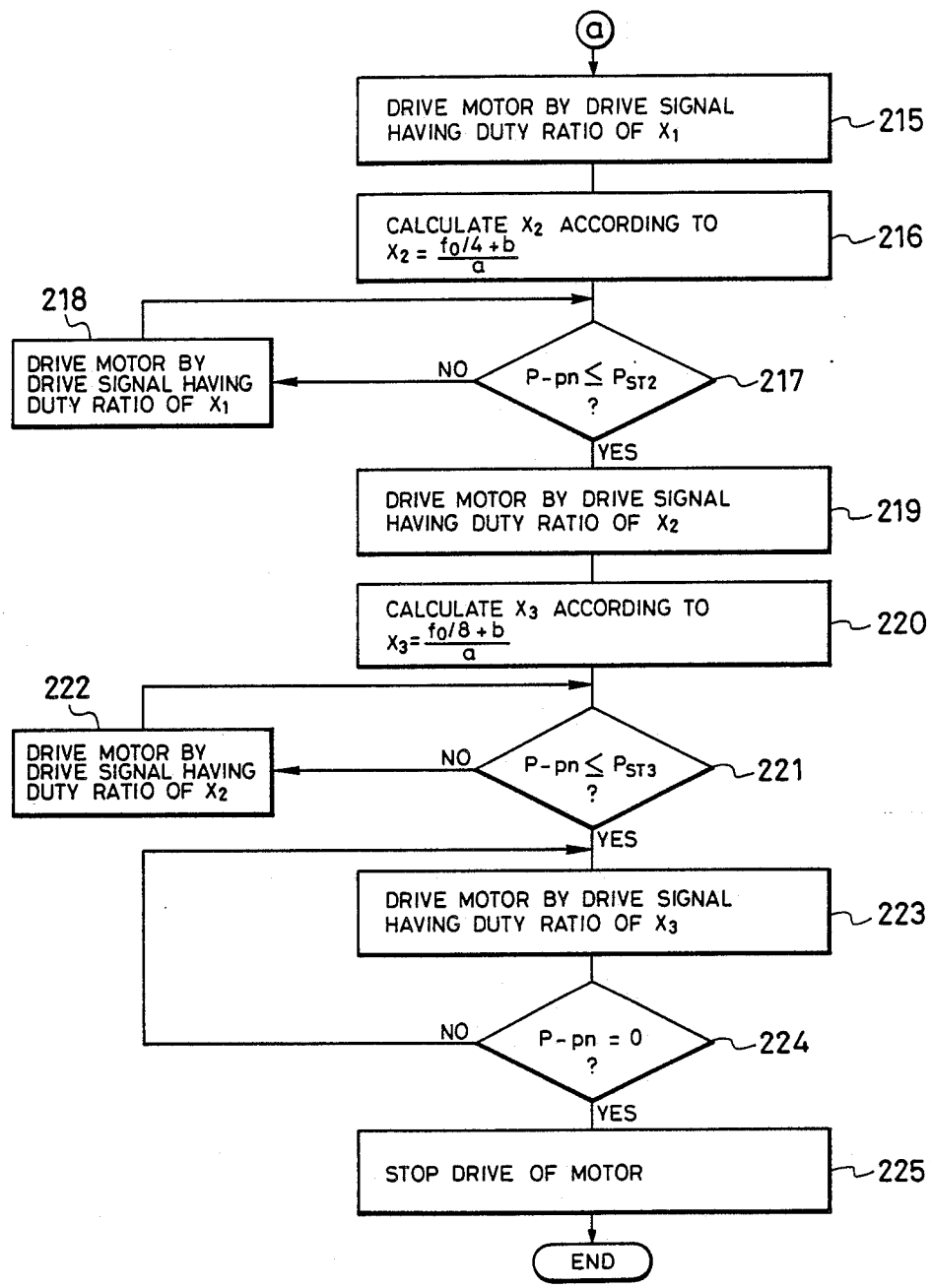

Conducive to a full understanding of the drive device of the invention, the operation of the drive device will be described with reference to FIGS. 5A and 5B and FIG. 6. FIGS. 5A and 5B are two parts of a flowchart showing the operations of the drive device. A program for performing the required operations is stored in the memory 101a of the CPU 101.

An automatic focusing mode is manually or automatically selected for a photographing operation (Step 201).

In the image pickup section 91, a part of the light received from the object and which has passed through the photographing lens 51 (FIG. 2) is integrated. The data output signal) provided by the CCD sensor is applied to the integration time comparator 93a and the arithmetic unit 101b of the CPU 101. In the arithmetic unit 101b, an amount D of defocusing is calculated (Step 202). In the described preferred embodiment, the amount D of defocusing is obtained according to the correlation method (phase difference system). The method is based on the fact that the distance between the images formed respectively on a reference CCD and a comparison CCD in the image pickup section 91 is substantially proportional to the amount of defocusing. As it is conventional, a further description of the method is omitted.

Next, it is determined whether or not the amount D of defocusing obtained in Step 202 is effective to obtain a motor drive pulse count value P (Step 203). This determination is carried out as follows: When for instance, the contrast ratio of the image formed on the reference CCD is larger than the reference value stored in the memory 101b, or the minimum value of the result of the correlation calculation done using the density data of the images formed on the reference and comparison CCDs is smaller than the reference value stored in the memory 101a, it is determined that the amount D of defocusing is effective. If the amount of defocusing is ineffective, then either the object is substantially zero in contrast or the amount of defocusing is considerably large. Therefore, in this case an auxiliary floodlight should be used or the focusing lens moved (Step 204) so that the amount D of defocusing which is effective can be obtained.

After the amount D of defocusing has been determined effectively, it is determined whether or not the lens is focused on the object (Step 205). That is, when the difference between the position of the picture element of the reference CCD exhibiting the minimum value in the correlation calculation and the position of the picture element predetermined for focusing is smaller than the reference value, it is determined that the lens is focused on the object. When the lens is focused on the object, the preparatory photographing operation is ended (Step 206).

In case of the amount D of defocusing being effective but the focusing being not obtained, the driving device for the focusing lens will be operated as follows.

The coefficient K is read out of the lens ROM 57 of the photographing lens 51 and applied to the arithmetic unit of the CPU 101 (Step 207).

The values K and D are utilized to obtain the pulse count value P of the encoder, which corresponds to the amount of movement of the focusing lens 35 to the focused position, according to equation (1) above, i.e., P=K·D (Step 208).

Next, the AF motor 95a is driven with a predetermined duty ratio. In this embodiment, the predetermined duty ratio is 1; that is, the DC control mode is employed. While the motor is driven in the DC control mode, the encoder 95d counts the number of pulses $P_n$ in association with the rotation of the AF motor (Step 209).

The detector 93c of the PCU 93 calculates from the number of pulses counted by the encoder 95d the frequency $f_0$ indicating the speed of movement of the focusing lens 53 driven in the DC control mode. The frequency $f_0$ thus calculated is stored in the memory 101a (Step 210).

Thereafter, the correcting value b in equation (2) is obtained. The correcting value is calculated as follows: The coefficient a is read from the lens ROM 57 and supplied to the arithmetic unit 101b, and $f_0$, obtained as described above, and the coefficient a are utilized to obtain the value b. The value b thus obtained is stored in a predetermined location in the memory 101a (Step 211).

In accordance with the invention, when the focusing lens 53 is moved to the focused position, the speed of the AF motor 95a is gradually decreased so that the focusing lens is smoothly and accurately moved to the focused position. For this purpose, the focusing lens is driven as follows: While the focusing lens 53 is being moved toward the focused position, the remainder of the number of drive pulses for movement of the lens to the focused position is continuously detected, and, when the remainder becomes smaller than a reference value, the AF motor is driven in the PWM control mode. Even after the remainder reaches the reference value, the remainder is monitored and compared with another reference value smaller than the first reference value so that the duty ratio of the drive signal in the PWM control mode is stepwise decreased. An example of such stepwise driving is illustrated by the graph of FIG. 6. The number of speed change steps and the drive frequencies indicated in FIG. 6 may be changed to suitable values according to the particular design employed. In FIG. 6, reference character I designates a DC control mode drive region. In the region I, the focusing lens is moved with a frequency $f_0$. In a region II, the focusing lens is moved with a frequency $f_0/2$. In a region III the focusing lens is moved with a frequency $f_0/4$. Finally, in a region IV, the focusing lens is moved with a frequency $f_0 8$.

The focusing lens is moved stepwise as described above. Therefore, in the drive device, the arithmetic unit 101b calculates the deference $(P-p_n)$ between the amount of drive P and the total number of pulses $p_n$ counted by the encoder from the start of the AF motor 95a. A reference pulse count value $P_{ST1}$ for switching from the region I to the region II in FIG. 6, a reference pulse count value $P_{ST2}$ for switching from the region II to the region III, and a reference pulse count value $P_{ST3}$ for switching from the region III to the region IV are stored in the memory 101a in advance. In this connection, it should be noted that $P_{ST1} > P_{ST2} > P_{ST3}$. These reference values may be predetermined fixed values, or they may be values which are determined in a certain ratio with respect to the amount of drive P.

Figure 6:
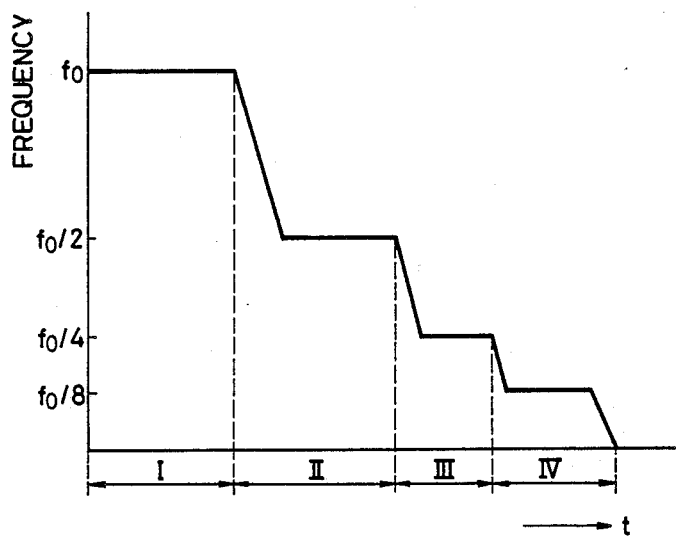
FIG. 6 is a graphical representation illustrating the stepwise variation of duty ratio of a drive signal in PWM control mode.

When the AF motor 95a is driven in the DC control mode, the arithmetic unit 101b determines drive conditions in the region II of FIG. 6 using the coefficient a stored in the lens ROM 57 and the values $f_0$ and b (correcting value) stored in the memory 101a. That is, in the described preferred embodiment, the duty ratio $x_1$ of the drive signal which reduces the speed of movement of the focusing lens 53 in the region II to half the speed of movement in the region I is calculated according to the following equation (Step 212):

$$x_1 = ((f_0/2) + b)/a$$

The comparator 101c determines whether $(P-p_n) \leq P_{ST1}$ in Step 213. When in Step 213 the result of the determination is "NO", the AF motor 95a is driven continuously in the DC control mode (Step 214). If the result of the determination is "YES", the AF motor 95a is driven with the drive signal of the duty ratio $x_1$ (Step 215).

When the AF motor 95a is driven with the drive signal of the duty ratio $x_1$, the arithmetic unit 101b determines the drive conditions in the region III in FIG. 6; that is, it calculates the duty ratio $x_2$ of the drive signal according to the following equation so that the speed of movement of the focusing lens in the region III is half the speed of movement in the region II (Step 216):

$$x_2 = ((f_0/4) + b)/a$$

The comparator 101c determines whether $(P-p_n) \leq P_{ST2}$ in Step 217. When in Step 217 the result of the determination if "NO", the AF motor 95a is driven continuously with the drive signal of the duty ratio $x_1$ (Step 218). If in step 217 the result of the determination is "YES", the AF motor 95a is driven with the drive signal of the duty ratio $x_2$ (Step 219).

When the AF motor 95a is driven with the drive signal of the duty ratio $x_2$, the arithmetic unit 101b determines the conditions in the region IV in FIG. 6; that is, it calculates the duty ratio $x_3$ of the drive signal according to the following equation so that the speed of movement of the focusing lens in the region IV is half the speed of movement in the region III (Step 220):

$$x_3 = ((f_0/8) + b)/a$$

Similar to the above-described cases, the comparator 101c determines whether $(P-p_n) \leq P_{ST3}$ in Step 221. When in Step 221 the result of the determination is "NO", the AF motor 95a is driven continuously with the drive signal of the duty ratio $x_2$ (Step 222). If in Step 221 the result of the determination is "YES", the AF motor 95a is driven with the drive signal of the duty ratio $x_3$ (Step 223).

When the AF motor 95a is driven with the drive signal of the duty ratio $x_3$, the comparator 101 detects when the remaining amount of drive $(P-p_n)$ reaches zero or a certain allowable value (Step 224). When in Step 224 the result is "NO", the AF motor is driven continuously with the drive signal of the duty ratio $x_3$ (Step 223 and 224). When in Step 224 the result if "YES", the AF motor 95a is stopped (Step 225).

With the drive device of the invention operated as described above, the variations in the speed of movement of the lens due to changes in the ambient temperature or the posture of the camera are corrected. In the above-described embodiment, the speed of movement of the focusing lens is reduced in four steps, and in every step the speed of movement is reduced to half the preceding speed of movement. Accordingly, the focusing lens is always accurately and smoothly moved to the focused position.

While a preferred embodiment of the invention has been described, the invention is not limited thereto or thereby. For instance, in the above-described embodiment, a single coefficient a or K is stored in the lens ROM. However, a plurality of coefficients a or K may be stored in the case where the photographing lens is a zoom lens. In such a case, a code board, which is designed so that the code changes with rotation of the zoom ring of the zoom lens, is built into the lens, and the coefficients are selected according to a given code.

The operation of the drive device has been described merely by way of example and can be changed and modified in various manners without departing from the invention. In addition, it goes without saying that the coefficient should be changed if the approximation expression is changed.

As is apparent from the above description, in the focusing lens drive method according to the invention, in moving the movable lens to the focused position with the amount of drive determined according to the amount of defocusing, first, changes in the load on the AF motor due to changes in the ambient temperature or the posture of the camera are taken into account and the speed of movement of the focusing lens corrected accordingly. According to the correction value, the actual drive speed and the data indicating the relation between the predetermined speed and the duty ratio of the drive signal, the subsequent drive conditions of the AF motor are determined.

As a result, the focusing lens can be accurately and smoothly moved to the focused position at a desired speed.

What is claimed is:

1. A method for driving a focusing lens to a focused position, comprising the steps of:
    applying a pulse-width-modulated signal to a drive device for moving said focusing lens toward said focused position, a duty ratio of said pulse-width-modulated signal being determined in accordance with prestored data;
    detecting a speed of movement of said focusing lens towards said focused position; and
    correcting said duty ratio of said pulse-width-modulated signal so as to move said focusing lens at a speed indicated by said prestored data.

2. A method for driving a focusing lens to a focused position, comprising the steps of:
    applying a pulse-width-modulated signal to a drive device for moving said focusing lens toward said focused position, a duty ratio of said pulse-width-modulated signal being determined in accordance with prestored data;
    detecting a speed of movement of said focusing lens toward said focused position; and
    correcting said duty ratio of said pulse-width-modulated signal based on said speed of movement of said focusing lens so as to move said focusing lens at a speed indicated by said prestored data,
    wherein said step of correcting said duty ratio further comprises: determining a correction value effective to correct for changes in said speed arising due to changes in ambient temperature or a posture of said lens relative to a direction of the force of gravity; storing said correcting value; and applying said correction value to correct said duty ratio.

3. The method for driving a focusing lens of claim 2, wherein said step of detecting said speed of movement of said focusing lens comprises producing a pulse signal having a frequency indicative of said speed of movement.

4. The method for driving a focusing lens of claim 3, wherein said correction value (b) is determined in accordance with:

$$b = a - f_0,$$

where a is a constant and $f_0$ is a frequency of said pulse signal for a duty ratio of 1 of said pulse-width-modulated signal.

5. The method for driving a focusing lens of claim 4, wherein said prestored data is effective to control said duty ratio such that said speed of movement of said focusing lens decreases stepwise as said focusing lens approaches said focused position.

6. The method for driving a focusing lens of claim 5, wherein said duty ratio ($x_n$) at any instant is determined in accordance with:

$$x_n = ((f_0/n) + b)/a,$$

where n is a sequential number of a one of said steps in effect at the present instant.

7. A method for driving a focusing lens to a focused position, comprising the steps of:
    applying a drive signal to a drive device for moving said focusing lens toward said focused position, a first duty ratio of said drive signal being determined in accordance with prestored data in a memory means, which represents relationship between a moving speed of said focusing lens and the duty ratio of said drive signal;
    detecting an actual moving speed of said focusing lens which is driven by said driving signal having the first duty ratio;
    determining a correction value effective to compensate a difference between the actual speed and the speed corresponding to the first duty ratio, the difference being caused by changes in ambient temperature or a posture of said lens relative to a direction of the force of gravity;
    determining a second duty ratio corresponding to a moving speed slower than the actual moving speed in accordance with the actual moving speed, the correction value and the prestored data; and
    applying a drive signal having the second duty ratio to the drive device for moving said focusing lens to said focused position.

8. The method for driving a focusing lens of claim 7 wherein the moving speed is represented by a frequency of a pulse signal.

9. The method for driving a focusing lens of claim 8 wherein said correction value (b) is determined in accordance with:

$$b = a - f_0,$$

where a is a constant and $f_0$ is a frequency of said pulse signal for a duty ratio of 1 of said drive signal.

10. The method for driving a focusing lens of claim 9, wherein said prestored data is effective to control said duty ratio such that said speed of movement of said focusing lens decreases stepwise as said focusing lens approaches said focused position.

11. The method for driving a focusing lens of claim 10 wherein the duty ratio ($x_n$) at any instant is determined in accordance with:

$$x_n = ((f_0/n) + b)/a,$$

where n is a sequential number of a one of said steps in effect at the present instant.

12. A method for driving a focusing lens to a focused position, comprising the steps of:
applying a drive signal to a drive device for moving said focusing lens toward said focused position at a first speed of movement of said focusing lens, a duty ratio of said drive signal being determined at 1, which indicates first control mode;
detecting a frequency indicative of the first speed thereof;
calculating a motor drive pulse count value to be compared with a reference value;
correcting said duty ratio of said drive signal so as to move said focusing lens under a second control mode at a second speed lower than said first speed when the motor drive pulse count value is smaller than the reference value, said second speed being obtained according to the first speed of movement and prestored data representing a relationship between the movement speed of said focusing lens and said duty ratio of said drive signal.

13. The method for driving a focusing lens of claim 12, wherein said step of correcting said duty ratio comprises: determining a correction value effective to correct for changes in said speed arising due to changes in ambient temperature or a posture of said lens relative to a direction of the force of gravity; storing said correcting value; and applying said correction value to correct said duty ratio.

14. The method for driving a focusing lens of claim 13, wherein said correction value (b) is determined in accordance with:

$$b = a - f_0,$$

where a is a constant and $f_0$ is a frequency of said pulse signal for the duty ratio of 1 of said pulse-width-modulated signal.

15. The method for driving a focusing lens of claim 14, wherein said prestored data is effective to control said duty ratio such that said speed of movement of said focusing lens decreases stepwise as said focusing lens approaches said focused position.

16. The method for driving a focusing lens of claim 15, wherein said duty ratio ($x_n$) at any instant is determined in accordance with:

$$x_n = ((f_0/n) + b)/a,$$

where n is a sequential number of a one of said steps in effect at the present instant.

* * * * *